(No Model.)
E. W. BARTON.
ADJUSTABLE CARRIAGE FOR JORDAN ENGINES AND OTHER MACHINERY.
No. 405,523. Patented June 18, 1889.
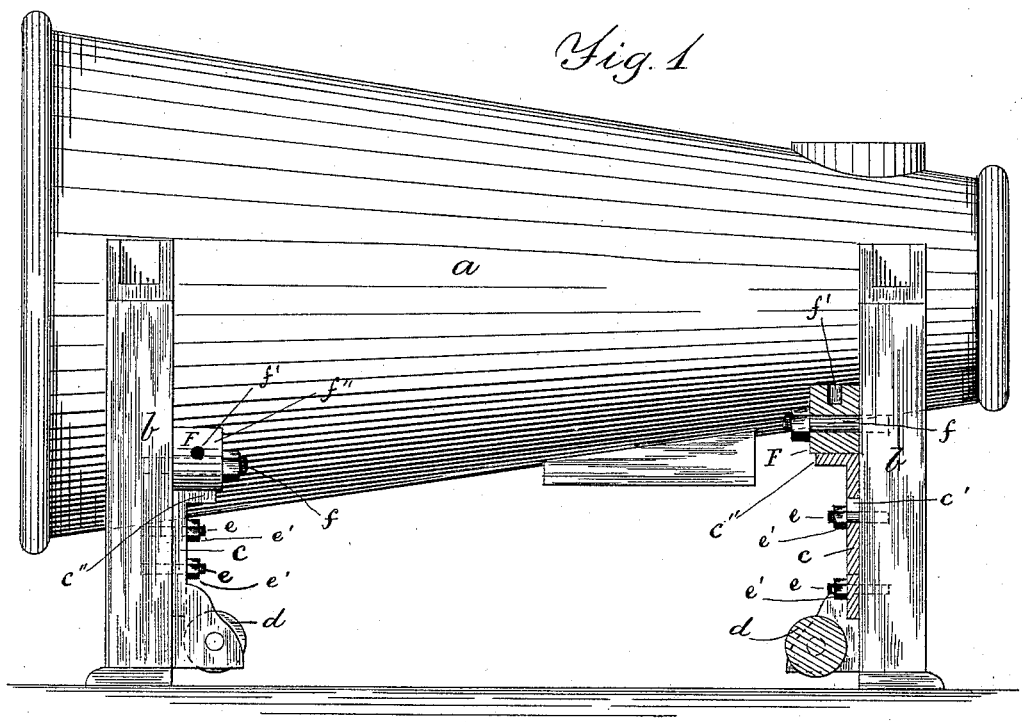
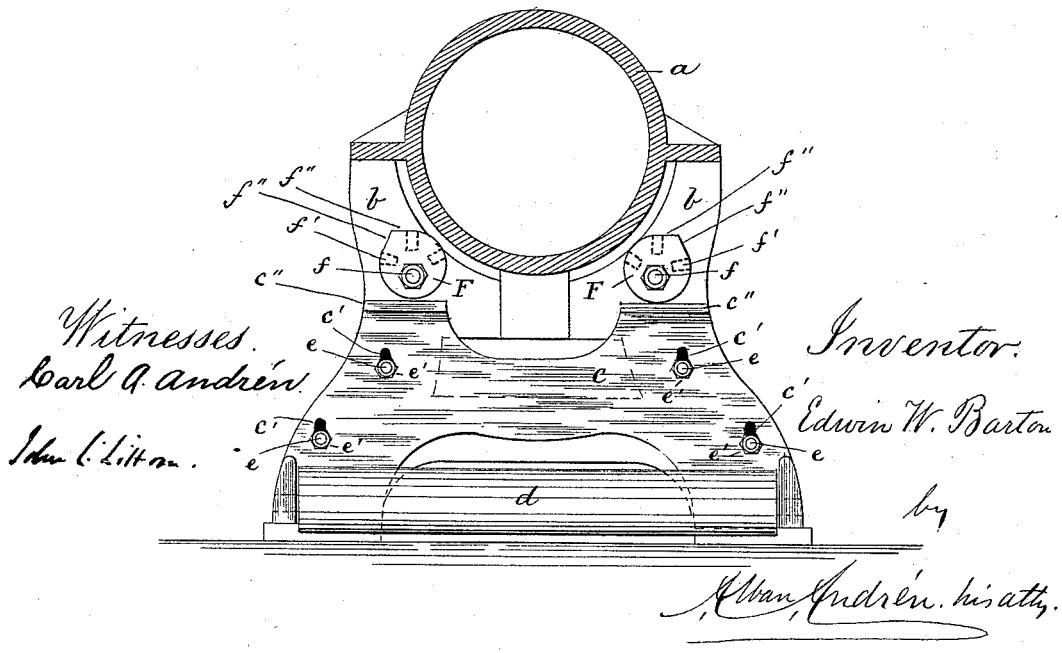

UNITED STATES PATENT OFFICE.

EDWIN W. BARTON, OF LAWRENCE, MASSACHUSETTS, ASSIGNOR OF ONE-HALF TO EDWIN CHURCHILL, OF SAME PLACE.

ADJUSTABLE CARRIAGE FOR JORDAN ENGINES AND OTHER MACHINERY.

SPECIFICATION forming part of Letters Patent No. 405,523, dated June 18, 1889.

Application filed January 4, 1889. Serial No. 295,435. (No model.)

*To all whom it may concern:*

Be it known that I, EDWIN W. BARTON, a citizen of the United States, and a resident of Lawrence, in the county of Essex and State of Massachusetts, have invented new and useful Improvements in Adjustable Carriages for Jordan Engines and other Machinery, of which the following, taken in connection with the accompanying drawings, is a specification.

This invention relates to improvements in adjustable carriages or trucks for the purpose of enabling machinery or other heavy objects to be moved easily from place to place, as may occasionally be required; and the invention is carried out as follows, reference being had to the accompanying drawings, wherein—

Figure 1 represents a side elevation of a Jordan pulp-engine provided with my improved adjustable carriage, one of the latter being shown in elevation and another in section. Fig. 2 represents an end view of the improved device.

Similar letters refer to similar parts wherever they occur on the different parts of the drawings.

In shops, factories, or warehouses it is often desired to move engines, machinery, or other heavy objects from one place to another, which is generally done by raising the object high enough above the floor to admit trucks or shoes and rollers to be placed under the frame of such object; but this is oftentimes not practicable, and generally requires a great deal of labor and time.

The object of my invention is to provide machinery and other heavy objects with an adjustable appliance by means of which the object can easily be moved from place to place.

In the drawings, $a$ represents an ordinary Jordan pulp-engine, on which $b\ b$ are the legs, frames, or supports, as usual. To the inside (or outside) of each of the supports $b$ is adjustably secured the metal plate or frame $c$, in bearings in the lower end of which is loosely journaled the roller $d$, as shown.

$c'\ c'$ are vertical slots in the plate $c$, through which pass loosely the fastening bolts or screws $e\ e$, which are firmly secured to the respective supports $b\ b$ and provided with adjustable nuts $e'\ e'$, as shown. If so desired, set-screws may be used to equal advantage without departing from the essence of my invention.

Above the plate $c$ are secured to the supports $b\ b$ the bolts or spindles $f\ f$, of which there may be one or more, according to the size or weight of the machine or other object, and on each such spindle is journaled a cam or eccentric disk F, preferably provided on its circumference with perforations or recesses $f'$, adapted to receive the end of a bar or rod while the operator is in the act of turning said cams or disks around their spindles. I also prefer to make the eccentrics or cam-disks F with peripheral flattened rest-surfaces $f''\ f''$, which are adapted to rest against the upper edges $c''\ c''$ of the plate $c$, when the latter is moved down on the supports $b$ to the limit of its motion in this direction.

While the machine or other object is at rest the cam-disks or eccentrics F and the plates $c$, with their rollers $d$, are in the positions as shown in the drawings.

If the machine is to be moved, I loosen the nuts $e'\ e'$ a little, so as to liberate the plates $c\ c$ from the supports $b\ b$. I then turn the eccentrics or cams F around their spindles $f$ until one of the flattened surfaces $f''$ rests against the upper edge $c''$ of the plate $c$. During the turning of said cams or eccentrics F the adjustable plates $c\ c$ are forced downward until their rollers $d\ d$ touch the ground or floor, when by a further turning of said cams the machine $a$ is raised enough to cause the bottom of its supports $b\ b$ to be lifted and held above the floor, thus causing the weights of the machine, &c., to be transferred to the rollers $d\ d$ and their plates $c\ c$. I now secure the latter to the legs or supports $b\ b$ by means of the bolts and nuts $e\ e'$, after which the machine may easily be rolled from one place to another. When the desired place for the machine, &c., is reached, the nuts $e'$ are loosened and the cams F are turned, thus liberating the plates $c\ c$ and causing the machine to sink until its supports reach the ground. If so desired, the rollers may remain in contact with the floor when the machine is at rest, or they may be raised slightly above the floor, as shown in the drawings, without departing from the essence of my invention.

Having thus fully described the nature, construction, and operation of my invention, I wish to secure by Letters Patent, and claim—

1. In an adjustable carriage, the combination of the legs or supports $b\ b$, bolts or spindles $f\ f$, secured thereto, cams or eccentrics F F, journaled on the spindles, plates $c\ c$, having rollers $d\ d$, and means for adjustably securing the plates to the supports, substantially as and for the purpose set forth.

2. In an adjustable carriage, the combination of the legs or supports $b\ b$, bolts or spindles $f\ f$, secured thereto, cams or eccentrics F F, journaled on the spindles and having flattened surfaces $f''\ f''$ and peripheral recesses $f'\ f'$, as described, plates $c\ c$, having rollers $d\ d$, and means for adjustably securing the plates to the supports, substantially as and for the purpose set forth.

In testimony whereof I have signed my name to this specification, in the presence of two subscribing witnesses, on this 23d day of May, A. D. 1888.

EDWIN W. BARTON.

Witnesses:
ALBAN ANDRÉN,
HENRY CHADBOURN.